(12) United States Patent
Spiel et al.

(10) Patent No.: US 10,621,873 B1
(45) Date of Patent: Apr. 14, 2020

(54) SYSTEMS AND METHODS FOR GENERATING GEOFENCES

(71) Applicant: Keep Truckin, Inc., San Francisco, CA (US)

(72) Inventors: Seth Brandon Spiel, San Francisco, CA (US); Numan Sheikh, Lahore (PK); Aamer Zaheer, Lahore (PK)

(73) Assignee: Keep Truckin, Inc., San Francisco, CA (US)

(*) Notice: Subject to any disclaimer, the term of this patent is extended or adjusted under 35 U.S.C. 154(b) by 0 days.

(21) Appl. No.: 16/536,440

(22) Filed: Aug. 9, 2019

(51) Int. Cl.
*G01C 21/26* (2006.01)
*G08G 1/00* (2006.01)
*G06F 16/9537* (2019.01)
*G06F 16/955* (2019.01)

(52) U.S. Cl.
CPC ........... *G08G 1/207* (2013.01); *G06F 16/955* (2019.01); *G06F 16/9537* (2019.01)

(58) Field of Classification Search
USPC ........................................... 340/992
See application file for complete search history.

(56) References Cited

U.S. PATENT DOCUMENTS

| 2016/0003627 A1* | 1/2016 | Bonhomme | H04W 4/029 |
| | | | 701/400 |
| 2019/0057372 A1* | 2/2019 | Batten | G07F 17/246 |

* cited by examiner

Primary Examiner — Brent Swarthout
(74) Attorney, Agent, or Firm — Vivek Ganti; Greenberg Traurig LLP (57) ABSTRACT

The present disclosure relates generating a geofence based on messages received periodically from a plurality of vehicles. A candidate geofence is approximated based on vehicle stoppage data obtained from a datalog of messages. For a given candidate geofence, additional stoppage data is obtained to identify additional vehicle stoppages. The locations of these additional vehicle stoppages are binned to a corresponding geospatial tile. A relatively large cluster of contiguous geospatial tiles form a geofence that may be transmitted to a client device.

17 Claims, 8 Drawing Sheets

| Gateway 001 | Gateway 002 | Gateway 003 | Gateway n |
|---|---|---|---|
| Location: (33.7,-84.3)<br>Speed: 15mph<br>Timestamp: 00:00:12 | Location: (44.4,-24.3)<br>Speed: 15mph<br>Timestamp: 00:00:03 | Location: (44.5,-24.3)<br>Speed: 0mph<br>Timestamp: 00:00:09 | |
| Location: (33.8,-84.2)<br>Speed: 15mph<br>Timestamp: 00:00:42 | Location: (44.5,-24.3)<br>Speed: 2mph<br>Timestamp: 00:00:33 | Location: (44.5,-24.3)<br>Speed: 0mph<br>Timestamp: 00:00:39 | |
| Location: (33.9,-84.2)<br>Speed: 20mph<br>Timestamp: 00:01:12 | Location: (44.5,-24.3)<br>Speed: 0mph<br>Timestamp: 00:01:03 | Location: (44.5,-24.3)<br>Speed: 0mph<br>Timestamp: 00:01:09 | |
| Location: (34.0,-84.2)<br>Speed: 15mph<br>Timestamp: 00:01:42 | Location: (44.5,-24.3)<br>Speed: 0mph<br>Timestamp: 00:01:33 | Location: (44.4,-24.3)<br>Speed: 5mph<br>Timestamp: 00:01:39 | |

| Stoppage Location | Duration |
|---|---|
| Location: (33.7, -84.3) | 28 |
| Location: (33.8, -84.2) | 18 |
| Location: (33.9, -84.5) | 44 |
| Location: (48.0, -60.3) | 4 |
| Location: (54.3, -70.2) | 11 |
| Location: (54.3, -70.2) | 3 |

} nearby locations (rows 1-3)

} nearby locations (rows 5-6)

SYSTEMS AND METHODS FOR GENERATING GEOFENCES

BACKGROUND

A vehicle gateway tracks the parameters of the vehicle and transmits it to a central server so the vehicle can be tracked. A fleet manager may deploy vehicle gateways in its fleet vehicles so that it can track the location of each vehicle in its fleet. The fleet manager may have access to a user interface to view the location of its fleet vehicles. In addition, the fleet manager may manually draw a geofence on a map so that a geofence crossing event is logged. In this respect, a geofence is geospatial boundary that may be defined on a coordinate system. A geofence may be visualized on a map.

As described in further detail below, the present disclosure recognizes that there are several drawbacks to the manual creation of geofences. The creation of manual geofences requires significant human input and judgment. Moreover, a manually created geofence might not align with real world results. The present disclosure addresses these issues as well as other issues.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout the several views.

DETAILED DESCRIPTION

Various embodiments of the present disclosure relates to generating a geofence based on extracting vehicle stoppage data from periodic vehicle tracking data. The vehicle stoppage data is collected from fleets of vehicles to identify areas that likely correlate to an area where vehicles stop for a significant period of time. Moreover, through the use of a multi-step algorithm of identifying a candidate geofence and then narrowing the boundaries of that candidate geofence, a highly specific geofence is generated.

The geofences according to the present disclosure are, therefore, recommended based on vehicle data. In other words, through detailed data analysis, the present disclosure identifies and recommends geofences to users (e.g., fleet managers), as opposed to the users defining their own geofences from scratch. As a result, the present disclosure provides insight that might not be readily apparent to a user who is tracking a fleet of vehicles.

For example, assume that there are 1,000 vehicles in a fleet driving over a particular region of a country. A fleet manager may be aware of where these vehicles typically begin and end their trips. The fleet manager may also be aware of one or more depots along the way between the beginning and ending of these trips. The fleet manager may manually create geofences to monitor when a fleet vehicle enters or exits a geofence. However, employing embodiments of the present disclosure, the fleet manager may learn his or her vehicles spend a significant amount of time stopping at a particular area. In addition, the present disclosure defines such an area as a recommended geofence with specific boundaries.

According to various embodiments, a specific geofence is generated based on a collection of relatively small, contiguous, geospatial tiles that define a geofence regardless of landmarks on a map. Rather than defining a geofence using roads or a predefined perimeter around a landmark (e.g., a rest area, a depot, etc.), the present disclosure is driven by deriving actual stoppage data from vehicles deployed in the field. As a result, a generated geofence may correspond to a particular parking lot or section of a parking lot, even if that parking lot is not near a rest area or depot. While the foregoing provides a high level summary, the details of the various embodiments may be understood with respect to the Figures.

Figure 1:
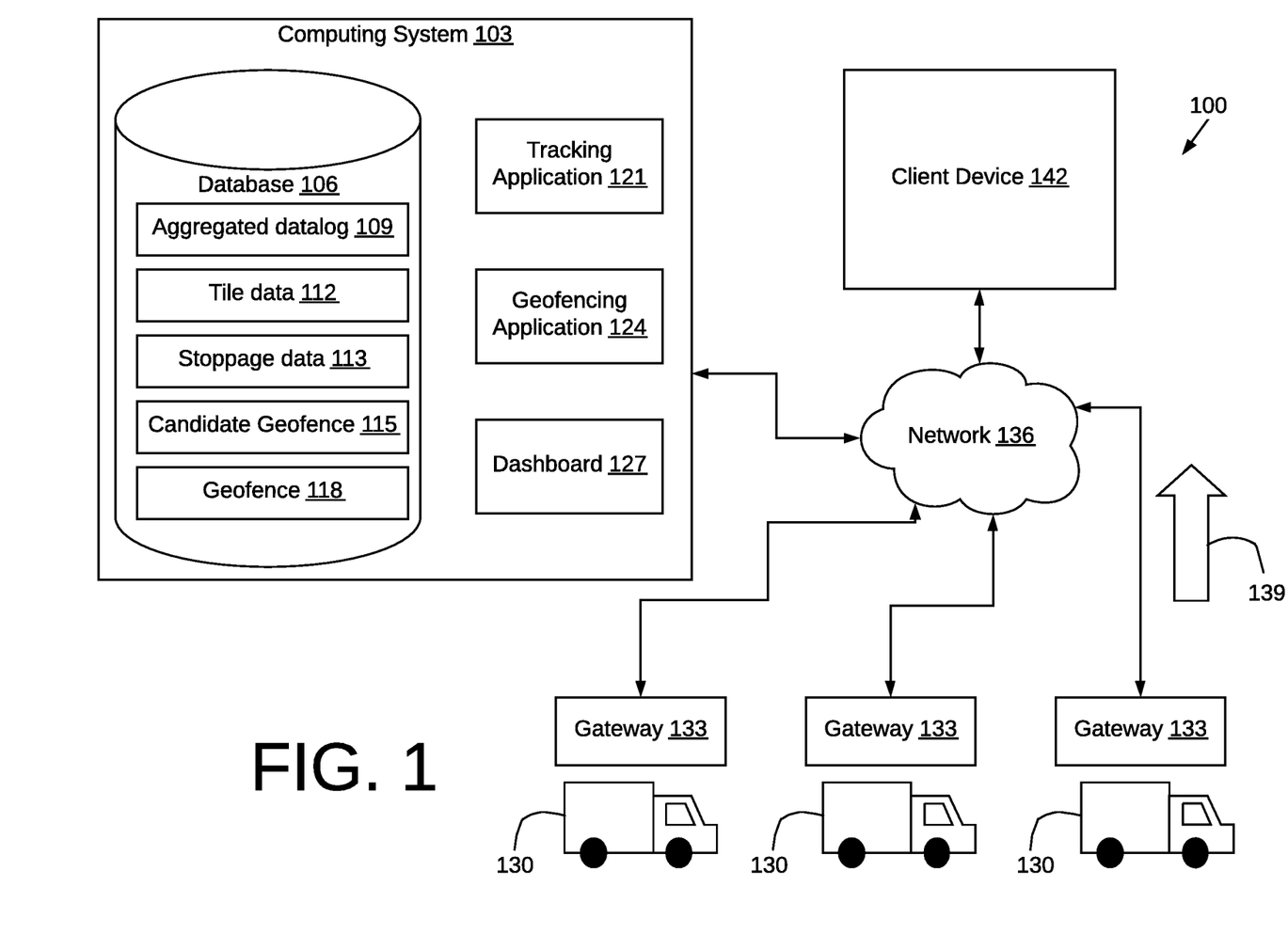
FIG. 1 is a drawing of a computing environment 100 according to various embodiments of the present disclosure.

FIG. 1 shows a computing environment 100 according to various embodiments. The computing environment includes a computing system 103 that is made up of a combination of hardware and software. The computing system 103 may comprise, for example, a server computer or any other system providing computing capability. Alternatively, the computing system 103 may employ a plurality of computing devices that may be arranged, for example, in one or more server banks or computer banks or other arrangements. Such computing devices may be located in a single installation or may be distributed among many different geographical locations. For example, the computing system 103 may include a plurality of computing devices that together may comprise a hosted computing resource, a grid computing resource and/or any other distributed computing arrangement. In some cases, the computing system 103 may correspond to an elastic computing resource where the allotted capacity of processing, network, storage, or other computing-related resources may vary over time. The computing system 103 may implement one or more virtual machines that use the resources of the computing system 103.

The computing system 103 includes a database 106. The database 106 may represent one or more databases 106. The database stores data such as, for example, an aggregated datalog 109, tile data 112, stoppage data 113, candidate geofences 115, and geofences 118. The data stored in the database may embodied as a file or as intermediate, temporary data that is stored by a program providing complicated computations. The computing system 103 executes software programs such as, for example, a tracking application 121, a geofencing application 124, and a dashboard 127. The programs executed by the computing system 103 and the data stored therein is described in further detail below.

The computing network is designed to track a plurality of vehicles 130. Each vehicle is equipped with a gateway 133. A gateway 133 refers to a device installed in the vehicle to collect vehicle data. A gateway 133 may be embodied as, for example, an electronic logging device, a telemetry device, or any other electronic system that obtains vehicle data and transmits it a network 136. A vehicle gateway 133 includes a processor, a memory system, a vehicle interface, and a communication module. The gateway sends messages 139 periodically over the network 136. The network 136 may be, for example, the Internet, intranets, extranets, wide area networks (WANs), local area networks (LANs), wired networks, wireless networks, cellular networks, or other suitable networks, etc., or any combination of two or more such networks.

Also connected to the network 136 is a client device 142. A client device 142 allows a user to interact with the components of the computing system 103 over a network 136. A client device 142 may be, for example, a cell phone, laptop, personal computer, mobile device, or any other computing device used by a user. The client device 142 may include an application such as a web browser or mobile application that communicates with the computing system 103 to access, manipulate, edit, or otherwise process data transmitted over the network 136.

Next, a general description of the operation of the various components of the computing system 103 is provided. Vehicles 130 are deployed in the field and may drive over a geographic area. Such vehicles 130 may be managed by one or more users who serve as a fleet manager. A gateway 133 is installed in each vehicle to track, monitor, and report vehicle activity. The gateway 133 interfaces with the vehicle to obtain the vehicle's speed, fuel level, diagnostics, vehicle system status, and other parameters associated with the vehicle. The gateway includes a location tracking module such as, for example, a Global Navigation Satellite System (GNSS) module to obtain geographic coordinates of the vehicle. The gateway 133 periodically transmits messages 139 over the network 136. A message 139 may be referred to as a breadcrumb, packet, report, or status update. The message 139 may include the vehicle's speed and location. The message 139 may further include any vehicle reporting which encompasses various metrics and parameters associated with the vehicle that are obtained by the gateway 133. Messages 139 may be transmitted periodically such as, for example, once every 30 seconds. In this respect, a message 139 is a sample of the vehicle's status. Receiving several messages 139 from a vehicle allows a vehicle to be tracked in real time.

A tracking application 121 executes in the computing system 103 for receiving and processing messages 139. The tracking application 121 performs various operations such as, for exampling, establishing a tracking session for each gateway 133, decoding and processing messages 139, and storing messages in a database 106. According to various embodiments, the vehicle tracking application 121 aggregates received messages 139 into an aggregated datalog 109. In this embodiment, the tracking application 121 identifies field values in each message 139 and populates a database table which forms an aggregated datalog 109. Each fleet of vehicles may have an aggregated datalog 109 that encompasses a comprehensive set of tracking data associated with each vehicle in the fleet. Moreover, a particular user account may organize its vehicles into multiple fleets.

A geofencing application 124 accesses the aggregated datalog 109 and processes it to generate one or more geofences 118 that may be recommended to a user. The geofencing application 124 derives stoppage data from the aggregated datalog 109 to identify instances where vehicles of a given fleet have stopped driving. Based on the stoppage data 113, the geofencing application 124 identifies one or more candidate geofences by identifying clusters of vehicle stoppages. This process coarsely identifies candidate geofences 115 before generating a more specific geofence 118. The use of candidate geofences as part of a coarse filtering analysis reduces processing constraints.

For a given candidate geofence 115, the geofencing application 124 accesses the aggregated datalog 109 to identify additional vehicle stoppages within, near, or around the candidate geofence 118. These additional vehicle stoppages may be determined using a different set of thresholds. Additional vehicle stoppages are binned into geospatial tiles using tile data 112. Tile data 112 represents a collection of geospatial tile having a geographical boundary. Tile data 112 is used to map a geographic location to a corresponding tile. A tile may be a square, rectangle, triangle, pentagon, hexagon, or other polygon that is tessellated over a geographic area. Each tile has a boundary that is characterized by a geographic coordinate system. Thus, a single geographic coordinate corresponds with a tile by falling within the boundary of the tile. The tile data 112 provides tile maps for different tile sizes. Assuming hexagonal tiles are used, a tile size of 1.5 kilometers defines a first tile system with equal sized tiles having a diameter of 1.5 kilometers that are tessellated over a geographic space. If smaller tiles are preferred, using a 0.1 kilometer tile size leads to a second tile system with 0.1 kilometer tiles that are tessellated over the geographic space. This, of course, would lead to more tiles when compared to a tile system using larger tiles.

Locations of vehicle stoppages may be binned into corresponding tiles. A contiguous cluster of tiles with a high bin count yields a geofence 118 that is specific and tailored to actual data obtained from automatically tracking vehicles.

Users who manage a fleet of vehicles 130 may interface with the fleet tracking services of the computing system 103 by way of a dashboard 127. A user uses a client device 142 to communicate with the computing system 103 over the network 136. Using an application (e.g., web browser) or a dedicated application, the user has access to a dashboard 127. The dashboard 127 provides a user with an overview of tracking data obtained from tracking a fleet of vehicles 130. In addition, the dashboard 127 presents the geofence 118 to the user as a recommended geofence that the user may adopt as part of tracking a fleet.

Figure 2A:
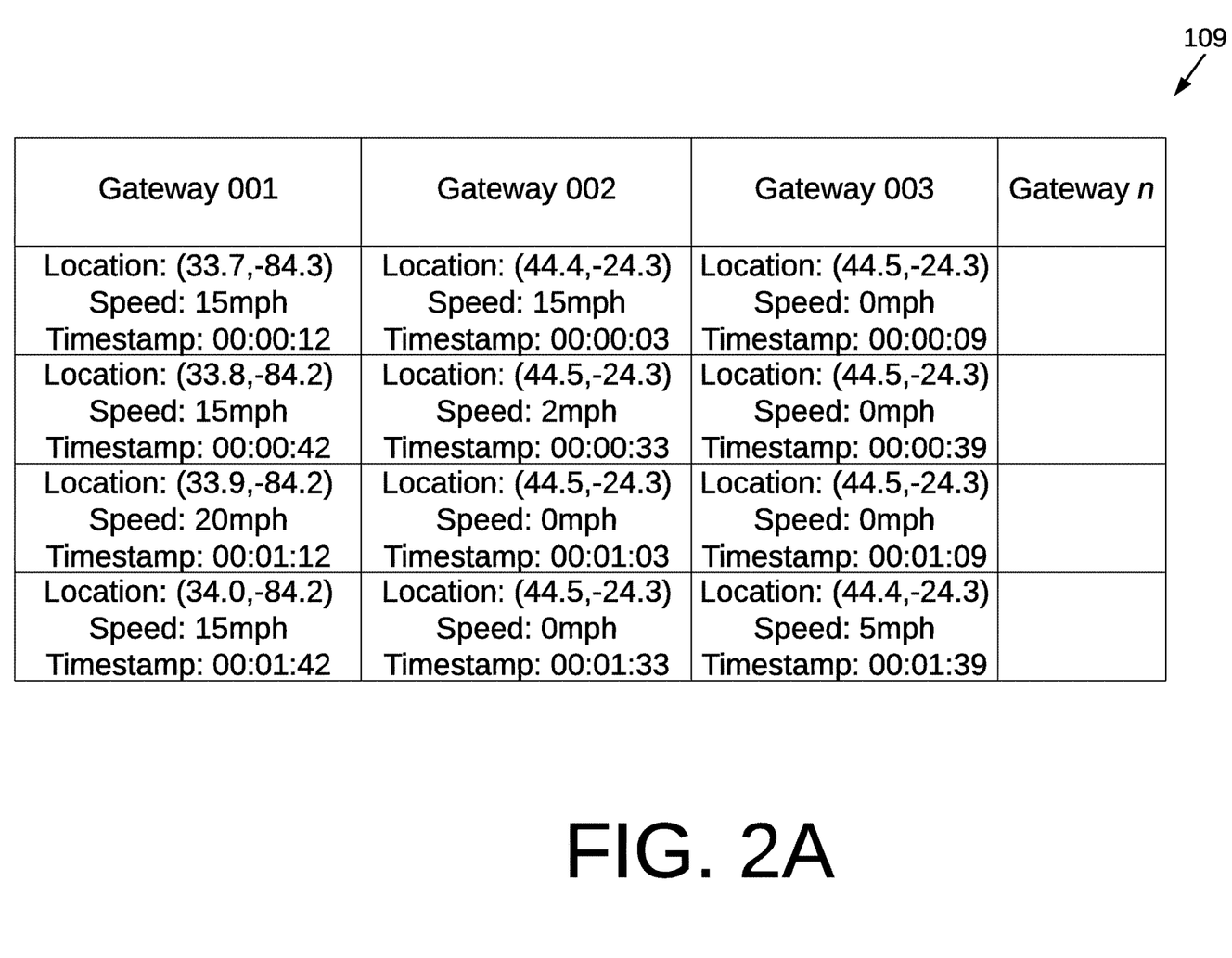
FIG. 2A is a drawing illustrating an example of an aggregated datalog 109, stored, processed, and accessed in a computing environment 100 of FIG. 1 according to various embodiments of the present disclosure.

FIG. 2A is a drawing illustrating an example of an aggregated datalog 109, stored, processed, and accessed in a computing environment 100 of FIG. 1 according to various embodiments of the present disclosure. The aggregated datalog 109 includes data collected from a plurality of gateways 133 (FIG. 1) associated with corresponding vehicles 130 (FIG. 1). Each column represents data from a different gateway 133. Each item for a given column has a corresponding timestamp. The aggregated datalog 109 may include data collected from the gateways 133 asynchronously such that the data from each message corresponds to a timestamp. The gateways 133 reporting the data in the aggregated datalog 109 may represent one or more fleets for a given user account. The example of FIG. 2A shows four samples worth of data. Messages transmitted from a given gateway 133 at a given time may include, for example, location data and speed data. Location data may be formatted as geographic coordinates.

Gateway 001 in FIG. 2A represents a vehicle having a speed greater than or equal to 15 miles per hour over four samples. For these four samples, the speed may be considered large enough to infer that the vehicle associated with Gateway 001 has not stopped. Gateway 002 in FIG. 2A represents a vehicle having a speed that reduces to zero over a period of four samples such that it is in the process of stopping. Gateway 003 in FIG. 2A represents a vehicle having a speed of zero that begins to increase by the fourth sample. This represents a vehicle that is moving after it has stopped.

Figure 2B:
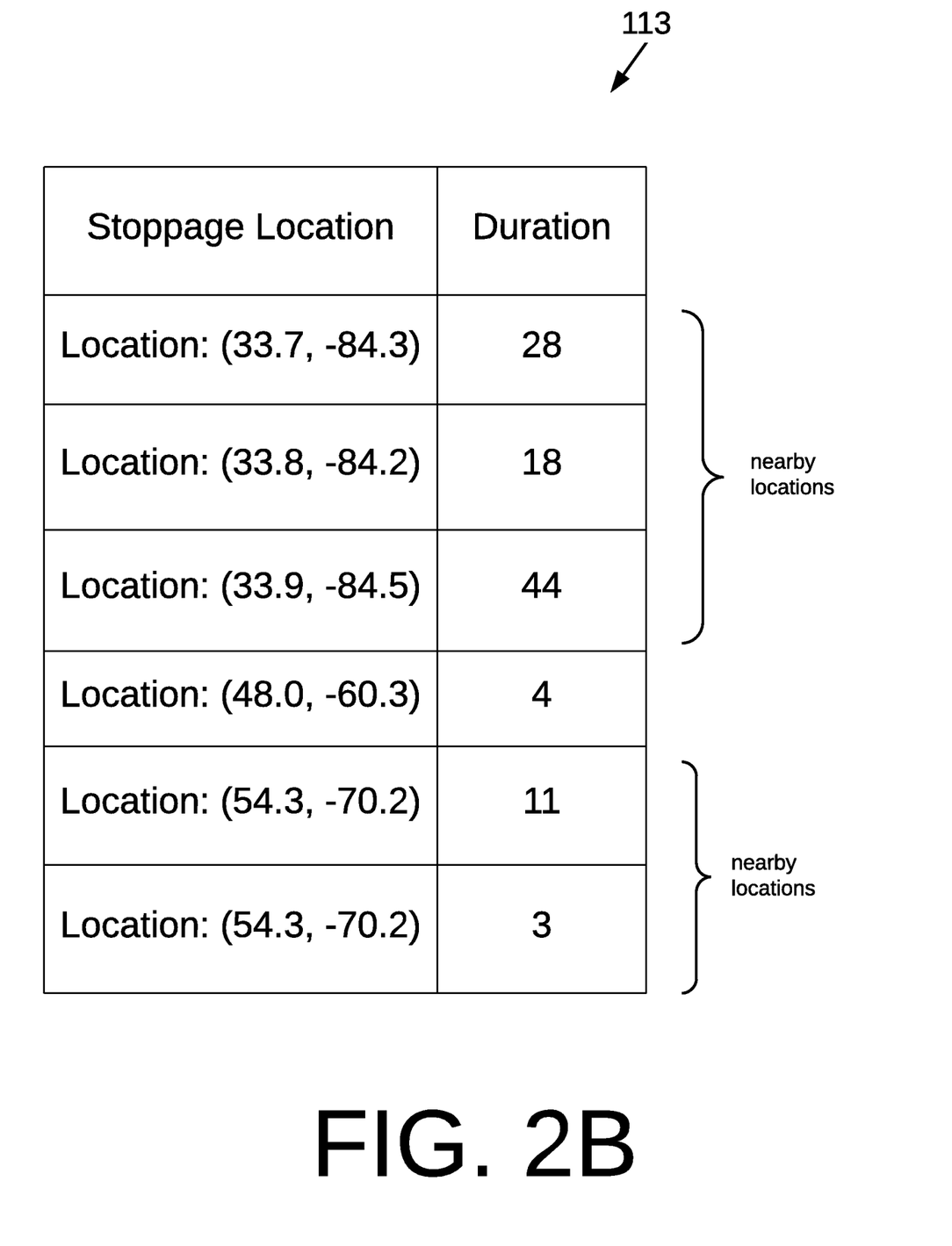
FIG. 2B is a drawing illustrating an example of stoppage data 113, stored, processed, and accessed in a computing environment 100 of FIG. 1 according to various embodiments of the present disclosure.

FIG. 2B is a drawing illustrating an example of stoppage data 113, stored, processed, and accessed in a computing environment 100 of FIG. 1 according to various embodiments of the present disclosure.

Stoppage data 113 is calculated from the aggregated datalog 109. According to various embodiments, the stoppage data 113 is determined for a subset of vehicles that contribute to the aggregated datalog 109. In this respect, because the aggregated datalog 109 may continuously grow as additional messages 139 are received, the aggregated datalog 109 can be extremely large in size. Therefore, when determining a candidate geofence 115 (discussed in further detail below), embodiments of the present disclosure are directed to considering a subset of the aggregated datalog 109 when deriving stoppage data 113. For example, the subset may be determined by identifying the vehicles that make up the largest fleet among several fleets belonging to a user account. Thus, the stoppage data 113 may reflect the stoppages of vehicles associated with a particular fleet but not all the fleets represented in the aggregated datalog 109.

Various threshold configurations may be applied to generate the stoppage data 113 by analyzing the aggregated datalog 109. The stoppage data 109 itemizes a plurality of vehicle stoppages and includes a location and a duration associated with each vehicle stoppage. To derive the vehicle stoppages, a geofencing application 124 (FIG. 1) may analyze the aggregated datalog 109 to identify instances where a vehicle gateway 133 has reported that a vehicle has no speed (e.g., a speed of zero or near zero to account for tolerance) for at least a predetermined period of time or a predetermined number of samples. For example, a vehicle stoppage may be defined as a vehicle having a speed of less than 0.25 miles per hour for at least 10 consecutive samples. This may account for signal noise when reading a vehicle's speed. In the example where each sample is taken once per minute, this translates to a vehicle that has not substantially moved for at least a 10-minute period. Upon identifying this instance in the aggregated datalog 109, the geofencing application 124 updates the stoppage data 113 to record this vehicle stoppage along with a corresponding location and duration.

FIG. 2B shows six vehicle stoppages derived from the aggregate datalog 109. Some of these vehicle stoppages show vehicles that have stopped nearby one another while others may be spread across a greater geographical area.

Figure 3:
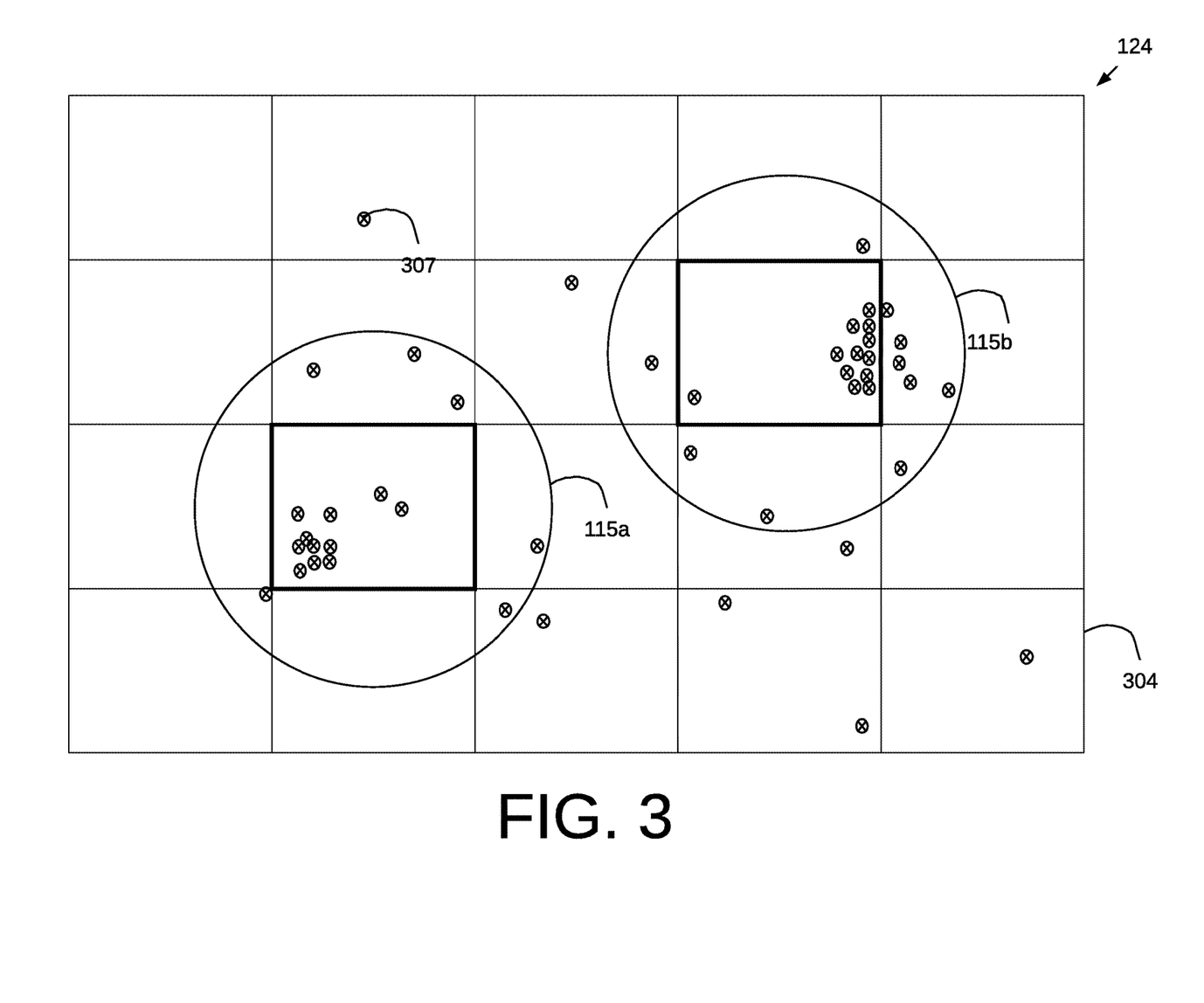
FIG. 3 is a drawing illustrating an example of operations performed by a geofencing application that executes in a computing environment 100 of FIG. 1 according to various embodiments of the present disclosure.

FIG. 3 is a drawing illustrating an example of operations performed by a geofencing application 124 that executes in a computing environment 100 of FIG. 1 according to various embodiments of the present disclosure. FIG. 3 shows a geofencing application 124 that identifies candidate geofences 115, such as a first candidate geofence 115a and a second candidate geofence 115b. FIG. 3 also shows a tile system having several large tiles 304. The geofencing application 124 uses a tile system with relatively large tile sizes to provide a coarse estimate of where a candidate geofence 115 should be. The tile sizes may each have a large tile size such as, for example, a 150-meter diameter. FIG. 3 also shows several vehicle stoppages 307 plotted on a map.

The geofencing application 124 associates each vehicle stoppage 307 to a corresponding large tile 304. Here, the geofencing application 124 uses the tile data 112 (FIG. 1) to determine which location of a given vehicle stoppage 307 is allocated to which large tile 304. Upon completion, the geofencing application 124 identifies those large tiles 304 having a bin count that exceeds a threshold amount. The bin count refers to the number of vehicle stoppages located within a given tile. FIG. 3 shows in bold, two large tiles 304 having a number of vehicle stoppages exceeding a threshold of ten stoppages. Large tiles 304 that do not have a threshold number of vehicle stoppages are removed from consideration. The geofencing application 124 forms a candidate geofence 115a, 115b around each of the tiles that have a sufficiently large number of vehicle stoppages. As shown in FIG. 3, the diameter of the candidate geofence exceeds the tile size. According to various embodiments, the diameter of the candidate geofence is 450 meters while the large tile size is 150 meters.

To summarize FIG. 3, the geofencing application 124 identifies one or more coarsely defined geofences based on deriving vehicle stoppages from an aggregated datalog 109 or a subset of vehicle stoppages from the aggregated datalog 109. FIG. 3 uses a first tile system having large tiles 304.

Figure 4A:
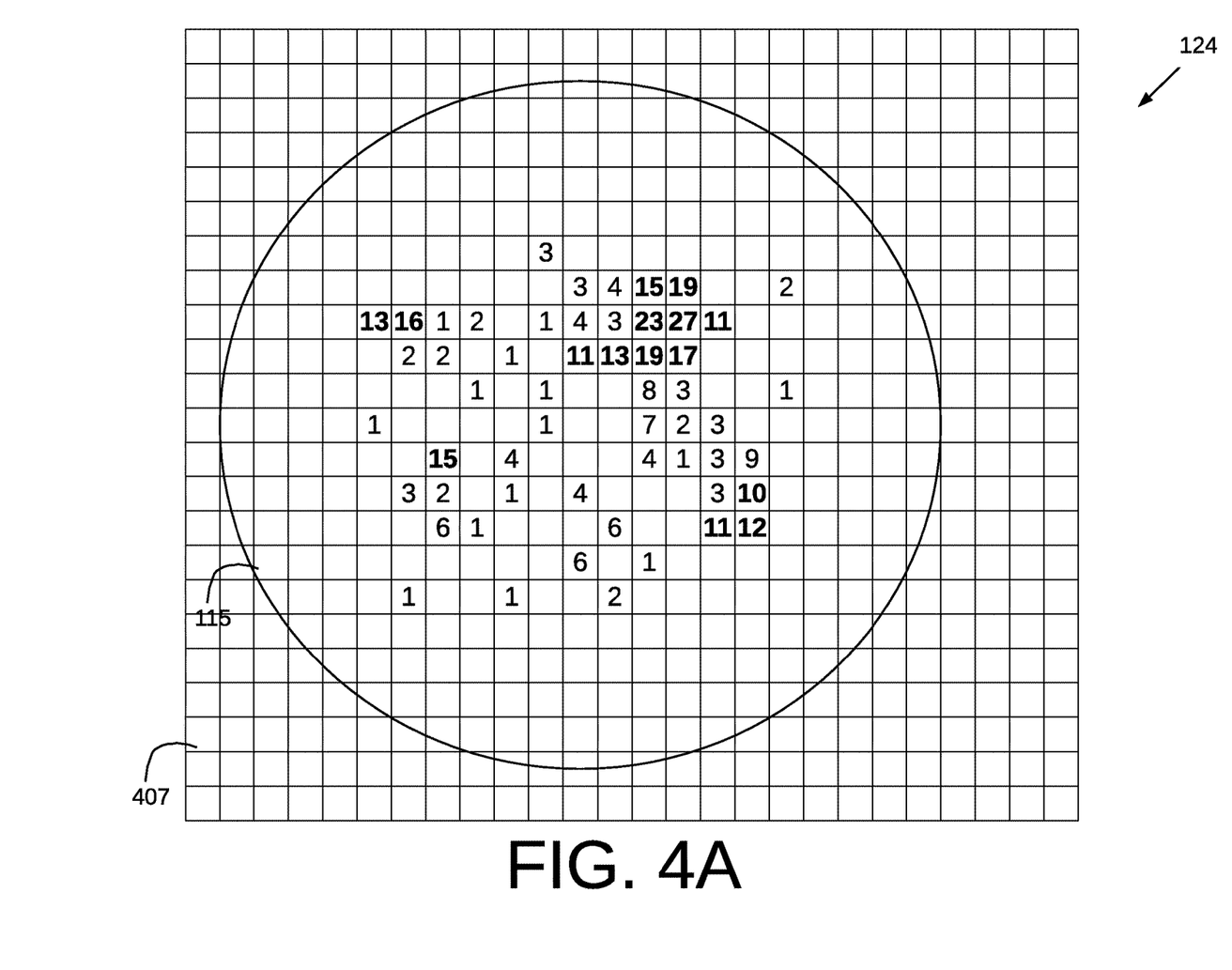
FIGS. 4A and 4B are drawings illustrating an example of operations performed by a geofencing application that executes in a computing environment 100 of FIG. 1 according to various embodiments of the present disclosure.
Figure 4B:
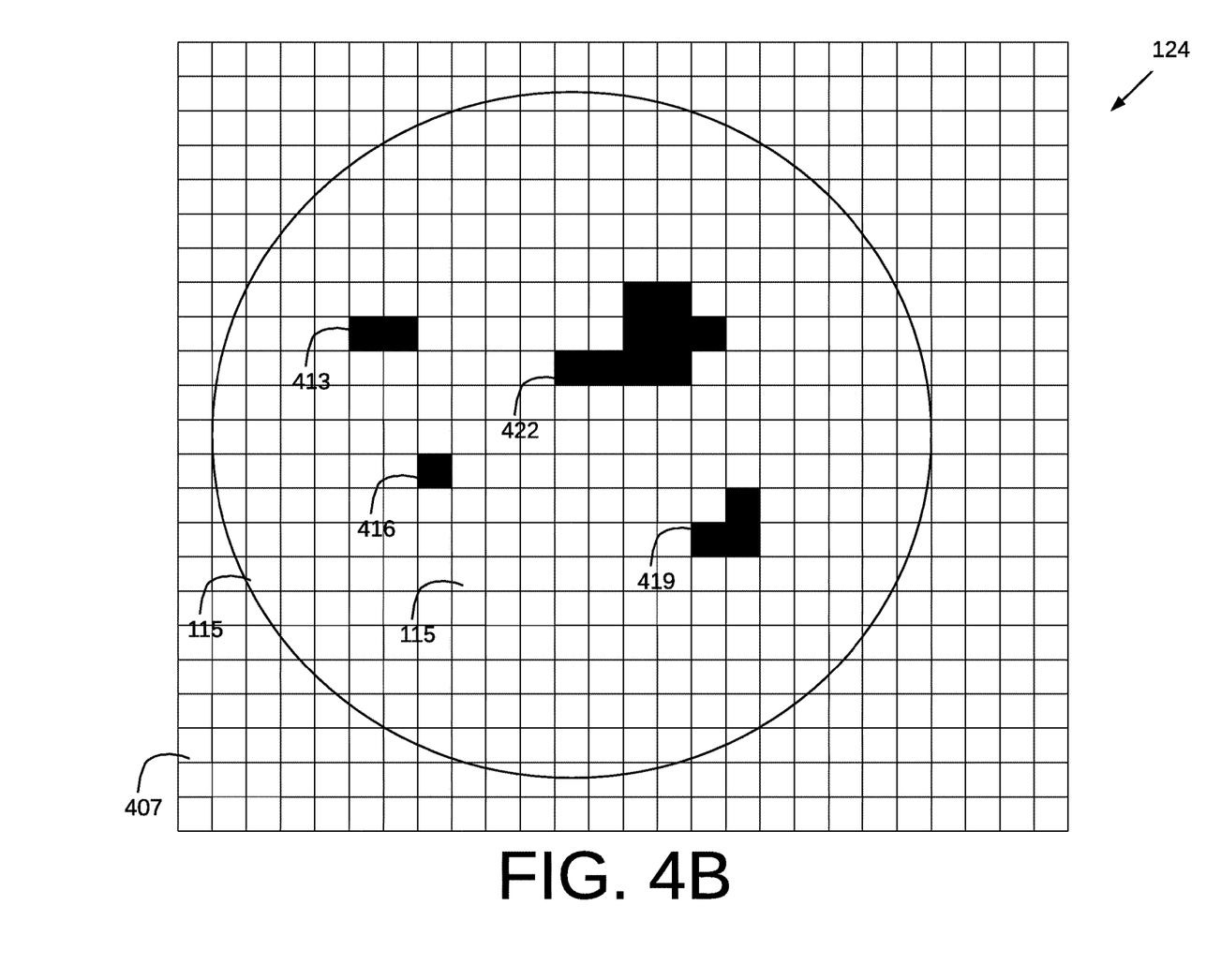

FIGS. 4A and 4B are drawings illustrating an example of operations performed by a geofencing application that executes in a computing environment 100 of FIG. 1 according to various embodiments of the present disclosure. FIGS. 4A and 4B specifically show how the geofencing application 124 fine-tunes the geofencing calculations by starting with the coarsely defined candidate geofence 115. FIGS. 4A and 4B build on the example of FIG. 3 by selecting one of the candidate geofences 115 and applying further processing to define a more specific boundary. In this respect, by determining a candidate geofence 115, the geofencing application 124 limits the amount of data under consideration to make processing more manageable when generating a geofence 118.

In FIG. 4A, the geofencing application 124 uses a second tile system based on a small tiles 407 that are smaller compared to the large tiles 304 of FIG. 3. The small tiles 407 of FIG. 4A may have, for example, a diameter of 10 meters. According to various embodiments, the geofencing application 124 accesses the entirety of the aggregated datalog 109 to identify all the vehicle stoppages within the candidate geofence 115. For example, while the candidate geofence 115 is determined using one fleet, the geofence 118 is determined using multiple fleets or potentially all fleets that contribute to the aggregated datalog 109.

The candidate geofence 115, as shown in FIG. 4A is made up of a plurality of small tiles 407 that, together, roughly form a circular shape (e.g., all small tiles 407 are within or touching the boundary of the candidate geofence 115).

In FIG. 4A, the geofencing application 124 bins each vehicle stoppage into a corresponding small tile 407 to determine a bin count for each tile. As shown, the number in each tile represents the number of vehicle stoppages associated within each small tile 407. Some small tiles 407 have no vehicle stoppages, some have one, and some have more than 10. Small tiles having a bin count that exceeds a threshold (e.g., 10 vehicle stoppages) are shown in bold.

FIG. 4B shows small tiles 407 having a bin count that exceeds a threshold number of vehicle stoppages in black and small tiles 407 having a bin count that falls below the threshold in white. Applying a threshold bin count yields a plurality of separate contiguous cluster of tiles including a first contiguous cluster of tiles 413, a second contiguous cluster of tiles 416, a third contiguous cluster of tiles 419, and a fourth contiguous cluster of tiles 422. The geofencing application 124 selects the largest contiguous cluster of tiles among the plurality, which is, in this case, the fourth contiguous cluster of tiles 422. The boundary of the largest contiguous cluster of tiles 422 forms the geofence 118 calculated from the vehicle stoppage data 113.

Figure 5:
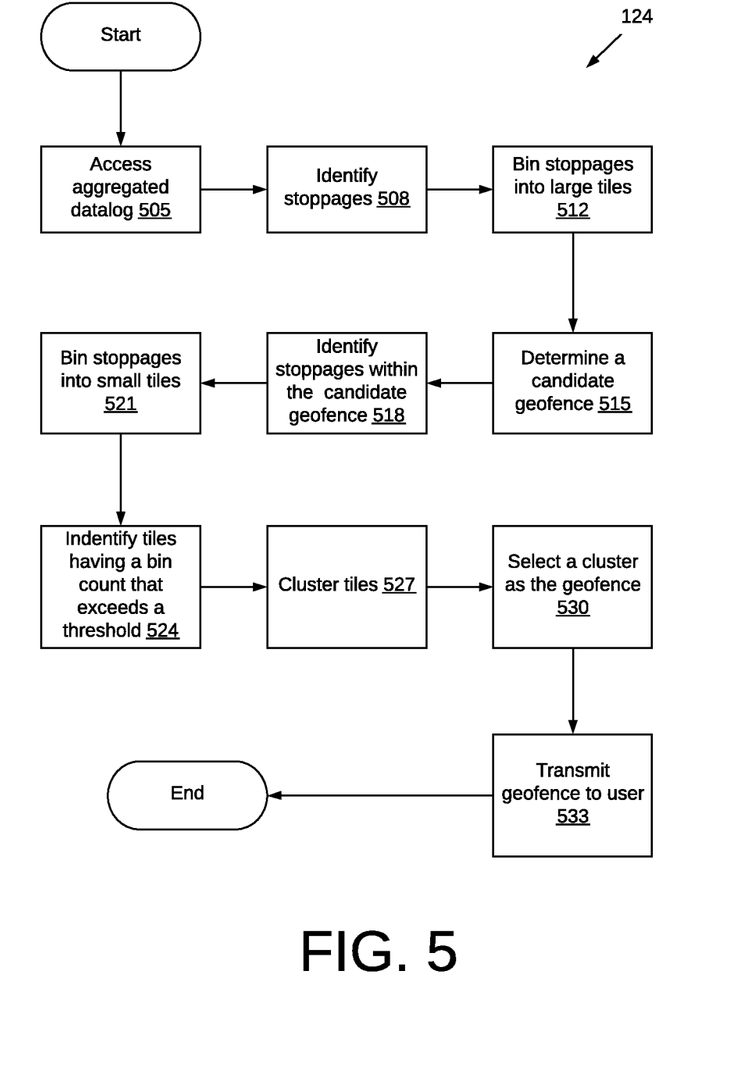
FIG. 5 is a flowchart illustrating an example of the functionality of the geofencing executed in a computing environment 100 of FIG. 1.

FIG. 5 is a flowchart illustrating an example of the functionality of the geofencing executed in a computing environment 100 of FIG. 1. It is understood that the flowchart of FIG. 5 provides merely an example of the many different types of functional arrangements that may be employed to implement the operation of the portion of the geofencing application 124 as described herein. As an alternative, the flowchart of FIG. 3 may be viewed as depicting an example of elements of a method implemented in the computing system 103 (FIG. 1) according to one or more embodiments.

At 505, the geofencing application 124 accesses an aggregated datalog 109 (FIG. 1). The computing system 103 (FIG. 1) that executes the geofencing application 124 periodically receives messages 139 (FIG. 1) from each of the plurality of vehicles 130 (FIG. 1). Each message 139 may include, for example, a location sample and speed sample for a corresponding vehicle 130. The computing system may aggregate the messages received from each of the plurality of vehicles to generate the aggregated datalog 109. For example, the computing system may identify specific values (e.g., a speed, a location, etc.) in each message 139 and populate a database field that makes up the aggregated datalog 109.

At 508, the geofencing application 124 identifies vehicle stoppages. The stoppages identified may correspond to a subset of vehicles for a particular user account. A vehicle stoppage is an event where a vehicle is at rest or nearly at rest within a small vicinity for a particular period of time (e.g., 20 minutes, 10 hours). The geofencing application 124 derives the vehicle stoppages by analyzing the speed and location data for each vehicle 130 over a period of several samples. For example, the geofencing application determines whether the number of consecutive speed samples that indicate no speed for a vehicle 130 exceeds a threshold stoppage time. If a gateway 133 (FIG. 1) reports no speed (e.g., a velocity that is zero or within a small range of zero to account for tolerance), the geofencing application 124 will determine the duration of time where there is no speed by counting the number of samples and accounting for the sample rate. Thus, if a vehicle 130 shows no speed for 20 samples with a sample rate of one sample per minute, then the geofencing application 124 infers that the vehicle 130 has stopped for 20 minutes. This information is recorded as a vehicle stoppage as part of the stoppage data 113. The stoppage data 113 may include all the vehicle stoppages over a period of time based on threshold configurations of stoppage duration and speed tolerance. A stoppage may also be defined if the location data reported by a vehicle does not substantially change for a particular length in time (e.g., a change in location being less than 10 meters over a period of 5 minutes). Thus, the determination of a stoppage may be based on a little to no movement and/or little to no speed for a particular duration of time. According to an embodiment, there are three configurable parameters that define a vehicle stoppage: 1) the duration (e.g. 20 min to 10 hours); 2) the area or vicinity of movement (e.g. within a 30 meter diameter) and 3) the maximum speed tolerated (e.g., less than 15 kilometers per hour). If all three parameters are met, the geofencing application 124 identifies this to be a stoppage.

At 512, the geofencing application 124 bins the vehicle stoppages 307 into large tiles 304 (FIG. 3). The geofencing application uses the tile data 112 to employ a first tile system using relatively large tiles 304 tessellated over a geographic region. Then, the geofencing application 124 counts how many vehicle stoppages 307 fall within each of the various large tiles 304. The geofencing application 124 converts the location of each vehicle stoppage 307 to a corresponding large tile 304.

At 515, the geofencing application 124 determines a candidate geofence 115 (FIG. 1). Here, the geofencing application applies a threshold number of vehicle stoppages to select the large tiles 304 that are associated with a sufficiently high bin count. According to various embodiments, the geofencing application 124 draws a boundary around each of these large tiles 304 to determine the candidate geofence 115. The boundary may be a circle or other shape having a diameter that exceeds the diameter of the large tile 304. Thus, the candidate geofence 115 may encompass a large tile 304 having a number of vehicle stoppages that exceeds a threshold as well as neighboring large tiles 304.

At 518, the geofencing application 124 identifies vehicle stoppages within the candidate geofence 115. The geofencing application 124 may access the aggregated datalog 109 to identify all vehicle stoppages within a particular candidate geofence. For example, unlike at 508, the geofencing application 124 considers a larger data set when determining vehicle stoppages.

At 521, the geofencing application 124 bins the vehicle stoppages into small tiles 407 (FIG. 4A). The geofencing application uses the tile data 112 to employ a second tile system using relatively small tiles 407 tessellated over a geographic region. Then, the geofencing application 124 counts how many vehicle stoppages 307 fall within each of the various small tiles 407. The geofencing application 124 converts the location of each vehicle stoppage to a corresponding small tile 407. The use of smaller tiles provides a more granular level of geofence definition based on first identifying a coarser candidate geofence 115.

At 524, the geofencing application 124 identifies small tiles having a bin count that exceeds a threshold. This operation identifies the small tiles 407 having the most frequent vehicle stoppages. At 527, the geofencing application 124 clusters the small tiles. For example, the geofencing application 124 identifies clusters of contiguous tiles, where each tile in the cluster has a bin count that exceeds the threshold. A tile that shares any boundary with any adjacent tiles are considered to form contiguous tiles.

At 530, the geofencing application 124 selects a cluster as the geofence 118. For example, the geofencing application 124 may select the largest cluster as the geofence 118, where the largest cluster is defined as the cluster having the most number of tiles. The boundary formed by the selected cluster is the boundary of the generated geofence 118. The geofencing application 124 may convert the boundary of the cluster of tiles into geographic coordinates and store those coordinates in the database 106 as the geofence 118. In addition, the geofence 118 may be processed to smoothen out the edges of the geofence 118. This may involve, for example, applying a minimum convex hull around the geofence 118 to reduce the number of sides of the geofence 118.

At 553, the geofence application transmits the geofence 118 to the user. The geofencing application 124 works in conjunction with a dashboard 127 (FIG. 1) to make the geofence available to the user. According to various embodiments, the geofence 118 is recommended to the user to be applied as part of a fleet tracking service. In addition, the user may label or edit a geofence 118 once it has been recommended by the dashboard 127. For example, the user may stretch or shrink a rendering of the geofence as it is overlaid on a map. Edits to the geofence are stored in the database 106.

Figure 6:
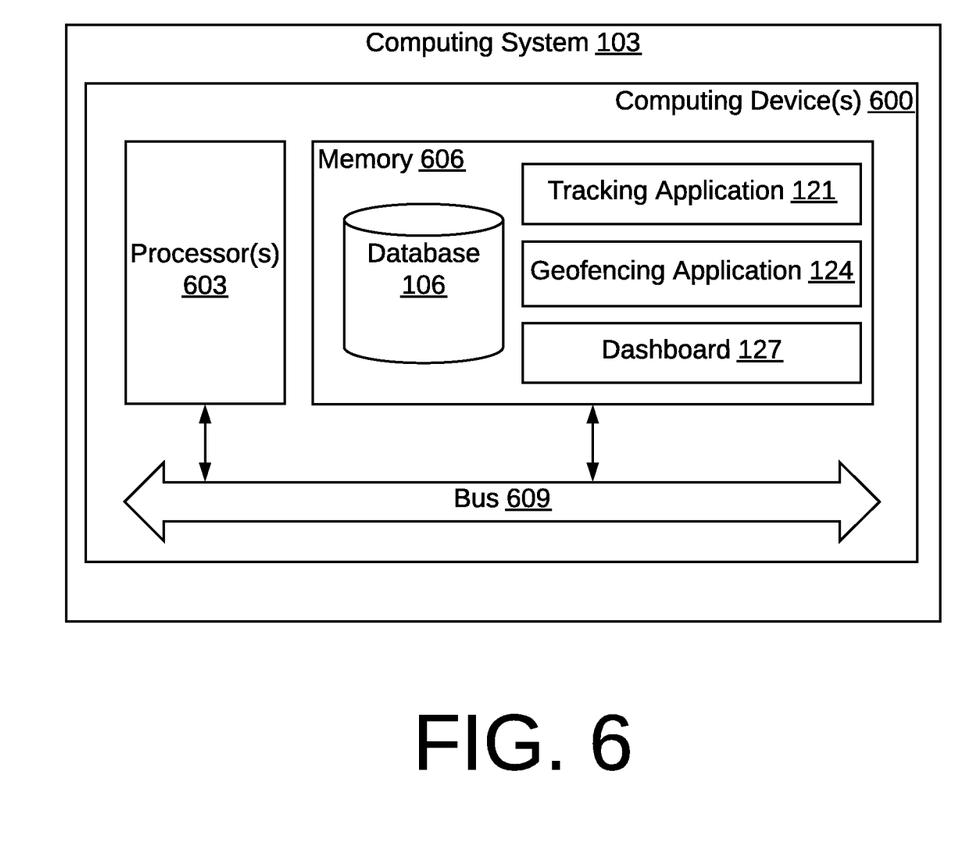
FIG. 6 is a schematic block diagram that provides one example illustration of a computing system 103 of FIG. 1 according to various embodiments of the present disclosure.

FIG. 6 is a schematic block diagram that provides one example illustration of a computing system 103 of FIG. 1 according to various embodiments of the present disclosure. The computing system 103 includes one or more computing devices 600. Each computing device 600 includes at least one processor circuit, for example, having a processor 603 and memory 606, both of which are coupled to a local interface 609 or bus. To this end, each computing device 600 may comprise, for example, at least one server computer or similar device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the tracking application 121, geofencing application 124, dashboard 127, and other applications providing location tracking services. Also stored in the memory 606 may be a database 106 and other data such as, for example, user count data or data that organizes vehicles into fleets. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed, such as, for example, C, C++, C#, Objective C, Java®, Swift, JavaScript®, Perl, PHP, Visual Basic®, Python®, Ruby, Go, or other programming languages.

Several software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the software applications described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts discussed above show the functionality and operation of an implementation of the software applications. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 603 in a computer system or other system. The machine code may be converted from the source code, etc. If embodied in hardware, each block may represent a circuit or a number of interconnected circuits to implement the specified logical function(s).

Although the flowcharts show a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The software applications described above may also comprise software or code that can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including software applications such as the tracking application 121, geofencing application 124, and the dashboard 127, may be implemented and structured in a variety of ways. For example, one or more applications described may be implemented as modules or components of a single application. Further, one or more applications described herein may be executed in shared or separate computing devices or a combination thereof. For example, the software application described herein may execute in the same computing device 600, or in multiple computing devices in the same computing system 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system comprising:
    a processor; and
    a memory coupled to a processor, the memory comprising a plurality of instructions, when executed, cause the processor to:
        access a datalog comprising location samples and speed samples for a plurality of vehicles;
        identify vehicle stoppages derived from the datalog, each vehicle stoppage corresponding to a respective stoppage location;
        determine a candidate geofence based on a cluster of vehicle stoppages being within a predefined diameter, and further based on the size of the cluster exceeding a predetermined threshold of stoppages;
        associate each vehicle stoppage within the candidate geofence to a corresponding tile;
        for each tile, determine a respective number of vehicle stoppages;
        identify a contiguous cluster of tiles, wherein each tile within the cluster has a respective number of vehicle stoppages that exceed a predetermined threshold count; and
        generate a geofence based on the boundary of the contiguous cluster of tiles, wherein the processor is configured to generate the geofence by determining that the contiguous cluster of tiles is the largest among a plurality of contiguous clusters of tiles within the candidate geofence.

2. The system of claim 1, wherein the memory comprising the plurality of instructions, when executed, cause the processor to:
    receive messages periodically from each of the plurality of vehicles, each message comprising a location sample and speed sample for a corresponding vehicle; and
    aggregate the messages received from each of the plurality of vehicles to generate the datalog.

3. The system of claim 1, wherein the processor is configured to identify the set of vehicle stoppages by determining whether the number of consecutive speed samples that indicate no speed for a vehicle exceeds a threshold stoppage time.

4. The system of claim 1, wherein the processor is configured to determine the candidate geofence by:
    identifying a tile within a first tile system, according to the size of the cluster exceeding the predetermined threshold of stoppages; and
    applying the predetermined diameter that surrounds the tile.

5. The system of claim 4, wherein the processor is configured to associate each vehicle stoppage to the corresponding tile using a second tile system, the second tile system comprising tiles that are smaller than the tiles of the first tile system.

6. A computer implemented method comprising:
    determining a candidate geofence based on a cluster of vehicle stoppages derived from a datalog, the datalog comprising location samples and speed samples for a plurality of vehicles, wherein determining a candidate geofence based on a cluster of vehicle stoppages derived from a datalog further comprises determining whether a threshold stoppage time is exceeded by the number of consecutive speed samples that indicate no speed for a vehicle;

accessing the datalog to identify a set of vehicle stoppages within the candidate geofence;
associating each vehicle stoppage in the set to a corresponding tile;
determining a respective number of vehicle stoppages for each tile;
identifying a contiguous cluster of tiles, wherein each tile within the cluster has a respective number of vehicle stoppages that exceed a predetermined threshold count, wherein identifying the contiguous cluster of tiles, comprises:
identifying a plurality of contiguous cluster of tiles; and
selecting the contiguous cluster of tiles as the largest among the plurality of contiguous cluster of tiles; and
generating a geofence based on the boundary of the contiguous cluster of tiles.

7. The method of claim 6, further comprising:
receiving messages periodically from each of the plurality of vehicles, each message comprising a location sample and speed sample for a corresponding vehicle; and
aggregating the messages received from each of the plurality of vehicles to generate the datalog.

8. The method of claim 6, wherein
determining the candidate geofence comprises:
identifying a tile based on a size of the cluster exceeding a predetermined threshold of stoppages and
applying a predetermined diameter that surrounds the tile to define the boundary of the candidate geofence.

9. The method of claim 6, wherein associating each vehicle stoppage in the set to the corresponding tile comprises determining which hexagonal tile defined in a tile map contains the location associated with the vehicle stoppage.

10. The method of claim 6, further comprising transmitting the geofence to a client device.

11. One or more non-transitory computer-readable, non-volatile storage memory comprising stored instructions that are executable and, responsive to execution by a computing device, the computing device performing operations comprising:
storing a datalog comprising location samples and speed samples for a plurality of vehicles;
identifying a tile of a first tile size that contains a threshold number of vehicle stoppages, the number of vehicle stoppages being derived from the datalog;
identifying a set of vehicle stoppages within a candidate geofence defined around the tile;
associating each vehicle stoppage in the set to a corresponding tile of a second tile size;
determining a respective number of vehicle stoppages for each file of the second tile size;
identifying a contiguous cluster of tiles of the second tile size, wherein each tile within the contiguous cluster has a respective number of vehicle stoppages that exceed a predetermined threshold count; and
generating a geofence based on the boundary of the contiguous cluster of tiles.

12. The one or more non-transitory computer-readable; non-volatile storage memory of claim 11, wherein the second tile size is smaller than the first tile size and wherein the candidate geofence comprises a diameter greater than the first tile size.

13. The one or more non-transitory computer-readable, non-volatile storage memory of claim 11, wherein the computing device further performs operations comprising:
receiving messages periodically from each of the plurality of vehicles, each message comprising a location sample and speed sample for a corresponding vehicle; and
aggregating the messages received from each of the plurality of vehicles to generate the datalog.

14. The one or more non-transitory computer-readable, non-volatile storage memory of claim 11, the number of vehicle stoppages is derived from the datalog by determining whether the number of consecutive speed samples that indicate no speed exceeds a threshold stoppage time.

15. The one or more non-transitory computer-readable, non-volatile storage memory of claim 11, wherein identifying the contiguous cluster of tiles of the second tile size comprises:
identifying a plurality of separate contiguous clusters of tiles; and
selecting the contiguous cluster of tiles as the largest among the plurality of separate contiguous cluster of tiles.

16. The one or more non-transitory computer-readable, non-volatile storage memory of claim 11, wherein associating each vehicle stoppage in the set to the corresponding tile of the second tile size comprises determining which hexagonal tile defined in a tile map contains the location associated with the vehicle stoppage.

17. The one or more non-transitory compute readable, non-volatile storage memory of claim 11, wherein the computing device further performs operations comprising transmitting the geofence to a client device.

* * * * *